United States Patent
Dufrene et al.

[11] 3,791,026
[45] Feb. 12, 1974

[54] METHOD OF JOINING A NIOBIUM TUBE TO A STAINLESS STEEL TUBE

[75] Inventors: Jean-Louis Dufrene, Aix-en-Provence; Jean Lacoste, Palaiseau; Robert Schley, Orly; Jean Tortel, Chatillon-sous-Bagneux, all of France

[73] Assignee: Commissariat a l'Energie Atomique, Paris, France

[22] Filed: Mar. 15, 1972

[21] Appl. No.: 234,805

[30] Foreign Application Priority Data
Mar. 19, 1971 France .......................... 7l.09823

[52] U.S. Cl................. 29/479, 29/481, 29/483
[51] Int. Cl............................................. B23k 31/02
[58] Field of Search ..... 29/478, 479, 481, 504, 483, 29/499, 503, 474.6

[56] References Cited
UNITED STATES PATENTS

| | | | |
|---|---|---|---|
| 235,834 | 12/1880 | White | 29/479 |
| 507,947 | 10/1893 | Crosby | 29/479 |
| 2,460,667 | 2/1949 | Wurzburger | 29/479 X |
| 3,205,573 | 9/1965 | Seal et al. | 29/479 X |
| 3,271,852 | 9/1966 | Long | 29/494 |
| 3,321,828 | 5/1967 | Miller | 29/494 X |

Primary Examiner—Richard B. Lazarus
Attorney, Agent, or Firm—William B. Kerkam, Jr.

[57] ABSTRACT

The method consists in fitting the end portions of the tubes one inside the other with a predetermined clearance, the steel tube being placed on the outside and provided at its extremity with an external machined annular flange forming a reservoir, in filling the reservoir with a suitable brazing compound, in placing the assembly in a vacuum and heating it to a temperature of 1,020° to 1,030°C and in removing the reservoir after the brazing operation.

2 Claims, 1 Drawing Figure

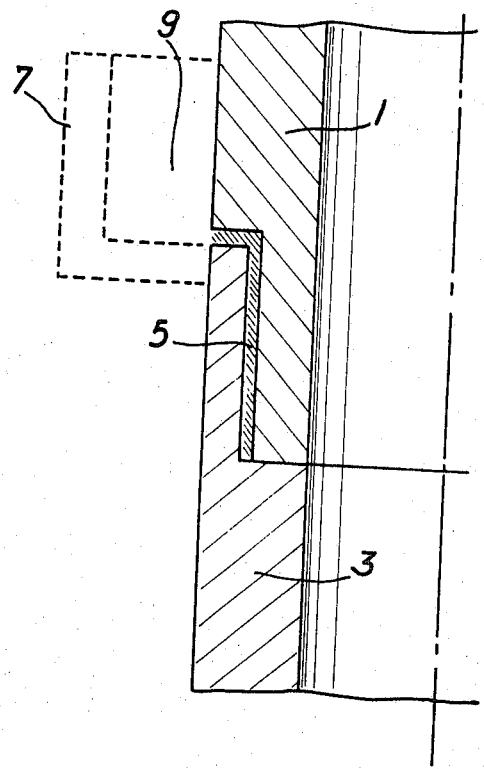

METHOD OF JOINING A NIOBIUM TUBE TO A STAINLESS STEEL TUBE

This invention relates to a method of forming a joint between two parts, and especially tubular parts, one of which is made of niobium and the other of stainless steel. One application for which the invention is of special interest is the attachment of sealing plugs in the irradiation cells which are employed for subjecting samples to radiations emanating from nuclear reactor cores during operation at power.

In order to form a joint of this type, it has been the practice up to the present time to make use of an intermediate part containing a high proportion of nickel, for example inconel containing 75 % nickel and 18 % chromium. This intermediate part was bonded to the niobium part by formation of a nickel-niobium eutectic compound and diffusion of the nickel in the niobium. Said intermediate part was also joined to the stainless steel part by means of a weld, as described in French patent Application No. 693 882 of Nov. 12, 1969 in the name of the present Applicant.

However, in the event that it is desired to assemble two tubular parts, especially if it is found necessary to secure a stainless steel sealing plug to a niobium tube, the method mentioned above has the disadvantage of entailing the need to weld the intermediate part to the steel plug.

The primary object of this invention is to propose a method of joining which overcomes the disadvantage referred-to above by forming a direct bond between the niobium part and the steel part with good characteristics of leak-tightness and mechanical strength.

In accordance with the invention, a method for joining a niobium tube to a stainless steel tube consists in fitting the tubes cylindrically one inside the other with provision for a clearance, the steel tube being located externally and provided at its extremity with an external machined annular flange forming a reservoir, in filling said reservoir with a suitable brazing compound, in placing the assembly in a vacuum and heating said assembly to a temperature of 1,020° to 1,030°C and, after brazing, in removing said reservoir in any suitable manner.

In accordance with a particular mode of application, the stainless steel contains a proportion of 18 % nickel and 8 % chromium and the brazing compound contains 10 % phosphorus, 13 % chromium and 77 % nickel.

In a preferred mode of execution, the clearance between the two tubes takes into account the differences in expansion between the stainless steel and the niobium during the brazing operation and the brazing compound is intended to fill said clearance during the treatment.

The complementary description which now follows and the accompanying drawings will in any case serve to gain a better understanding of the invention and are obviously given solely by way of indication without any limitation being implied.

In the accompanying drawing, the single FIGURE is a vertical half-sectional view of a joint in accordance with the invention.

As is apparent from the figure, the method according to the invention consists in forming a direct bond between the cylindrical parts of niobium 1 and of stainless steel 3 by means of a layer 5 of brazing compound. The parts 1 and 3 are interengaged cylindrically so that the steel tube 3 is located on the outside and leaves a clearance in which the brazing compound 5 is to be placed, and which takes into account differences in expansion between the stainless steel and the niobium at the treatment temperature. Before the joining operation is performed, the steel tube 3 is provided at the top portion which surrounds the niobium tube 1 with an annular flange 7 shown in dashed lines and constituting a reservoir 9 in which the brazing compound is placed. This compound is advantageously constituted by an alloy containing 10 % phosphorus, 13 % chromium and 77 % nickel. The assembly is placed in a vacuum and heated to a temperature of 1,020° to 1,030°C. When the brazing compound has penetrated into the clearance 5, the treatment is stopped and the annular flange 7 together with any filler metal which may have remained within the space 9 are removed in any suitable manner.

The joints obtained by means of this method are particularly leak-tight and exhibit excellent mechanical strength. In particular, they are impervious to the helium spectrometer and the ultimate shear strength of the brazed joint is higher than 10.6 kg/mm$^2$.

In one example of a joint formed in accordance with the invention between two cylindrical parts, one of niobium and the other of stainless steel, each having an internal diameter of 22.5 mm and an external diameter of 26.5 mm, the bursting pressure of the joint is higher than 250 bars and said joint is leak-tight after 50 thermocycles between 215° and 220°C, with a thermal gradient within the thickness of the tube of 150°C at maximum value and an internal pressure of 160 bars in the hot state.

Moreover, the joint obtained by means of the method according to the invention exhibits resistance to corrosion by liquid sodium. This method can thus be readily applied to the brazing process for closing the sealing plugs of irradiation cells which are employed in reactors of the liquid sodium cooled type.

What we claim is:

1. A method of joining a niobium tube to a stainless steel tube, wherein the tubes are interengaged cylindrically with a clearance forming an annular channel along the common portion of both tubes and which is open to the exterior, the steel tube being located externally and provided at its extremity with an external machined annular flange forming an annular reservoir in which the bottom of said reservoir communicates with the external annular opening of the channel, said reservoir is then filled with a suitable brazing compound, the assembly is placed in a vacuum and heated to a suitable temperature so as to cause the penetration of the brazing compound into the channel and said reservoir is removed in any suitable manner after the brazing operation, said brazing compound consisting of 10% phosphorus, 13% chromium and 77% nickel and the brazing temperature being within the range of 1,020° to 1,030° C.

2. A method of joining in accordance with claim 1 wherein said stainless steel contains 18 % nickel and 8 % chromium.

* * * * *